Jan. 26, 1971     KOJI TSUKADA     3,557,628
ACCELEROMETER
Filed Dec. 17, 1968     3 Sheets-Sheet 1
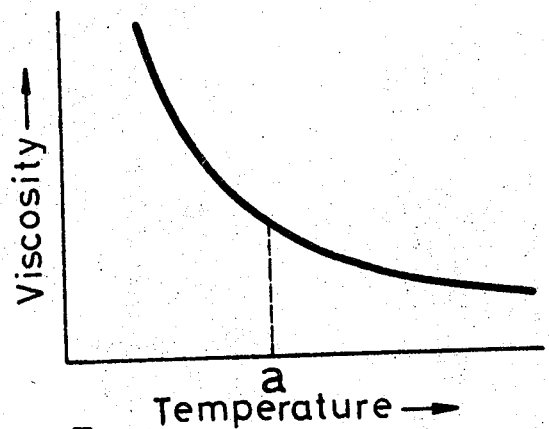
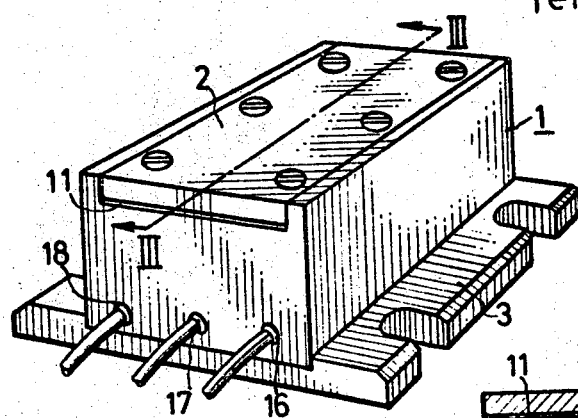
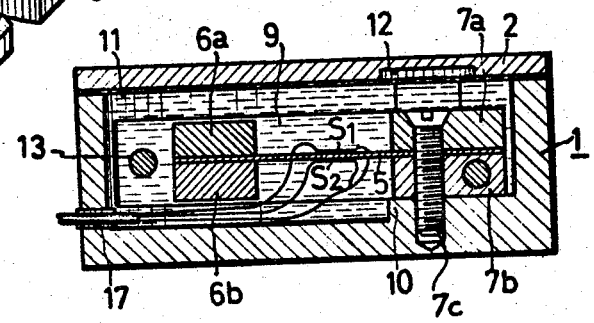
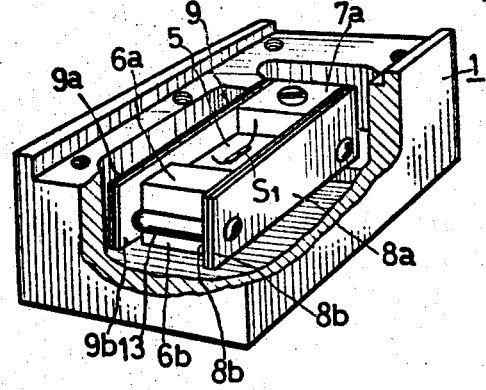
INVENTOR.
KOJI TSUKADA,
BY
Berman, Davidson & Berman
ATTORNEYS.

Jan. 26, 1971 KOJI TSUKADA 3,557,628
ACCELEROMETER

Filed Dec. 17, 1968 3 Sheets-Sheet 2

INVENTOR.
KOJI TSUKADA,

BY
Berman, Davidson & Berman.
ATTORNEYS

United States Patent Office 3,557,628
Patented Jan. 26, 1971

3,557,628
ACCELEROMETER
Koji Tsukada, Nagoya-shi, Aichi-ken, Japan, asignor to Kabushiki Kaisha Toyota Chuo Kenkyusho, Nagoya-shi, Aichi-ken, Japan
Filed Dec. 17, 1968, Ser. No. 784,401
Claims priority, application Japan, Dec. 27, 1967, 43/83,846; May 28, 1968, 43/36,591
Int. Cl. G01p 15/00
U.S. Cl. 73—516
9 Claims

ABSTRACT OF THE DISCLOSURE

An accelerometer comprising a vessel filled with viscous liquid wherein is immersed a cantilever beam vibrator between a pair of damping walls close to and on both sides of the vibrator. Said damping walls are bi-metal strips which bend in a direction to reduce the space between said pair of damping walls when the temperature of said liquid is raised, thereby compensating for temperature change of the liquid and said walls have a stop element provided at an intermediate point between the fixed and free ends thereof. Desirably, several vibrators mounted at right angle to each other are housed in one vessel. To compensate for change in pressure of said liquid, a compressible and expansible fluid chamber is provided in the vessel and subjected to pressure of the liquid therein.

---

The present invention relates to accelerometers employing cantilever beam vibrators within a vessel filled with a liquid such as oil sealed therein, and more particularly, to an improved accelerometer wherein a pair of damping walls are positioned close to both sides of the cantilever beam vibrator, the viscosity of the liquid in the space between said damping walls absorbing free vibrations of the vibrator, and, despite a wide range of temperature variation, making it possible to accurately detect acceleration by automatically adjusting the width of said space.

Conventional accelerometers for measuring the acceleration of a moving body utilize a vibrator fixed at one end to a base attachable to a moving body, a weight supported on the free end of the vibrator, and a strain gauge secured on the surface of said vibrator. Accelerometers of this type cannot accurately follow abrupt changes of acceleration because of the natural frequency of the vibrator. Therefore, the vibrator is immersed in oil whose viscosity resistance serves to absorb and eliminate the inherent natural frequency vibrations so that the vibration of the vibrator will correspond to a momentary change of acceleration.

Generally speaking, the change of viscosity resistance of the liquid with temperature is large, and air foams are often generated in the oil along with elevation of temperature, so that the viscosity resistance of the oil is further reduced.

Moreover, when acceleration is measured by the above mentioned conventional accelerometer, if the direction of the vibration given to a moving body and that of the vibration of the vibrating plate do not agree, it is impossible to detect the correct acceleration and, therefore, several accelerometers are employed, or it is necessary to variously select the direction in which the acccelerometer is attached.

It is a primary object of the present invention to provide an improved accelerometer which correctly detects momentary and abruptly changing acceleration.

Another object of the invention is to provide an improved accelerometer for correctly detecting acceleration by compensating for the measurement errors caused by a wide range of change of temperatures.

A further object of the invention is to provide an improved accelerometer for simultaneously and correctly detecting polydirectional accelerations.

A still further object of the invention is to provide an improved accelerometer which maintains the pressure of the liquid within the vessel of the accelerometer nearly constant regardless of change of temperature, eliminates the measurement errors caused by changes of liquid pressure, and prevents damage to the vessel and leakage of said liquid.

The novel features which are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts through the several figures, and in which:

FIG. 1 is a diagram showing the relation between the temperature and viscosity of oil in the accelerometer vessel;

FIG. 2 is a perspective view of an accelerometer constructed according to the present invention;

FIG. 3 is a cross-sectional view taken on line III, III of FIG. 2;

FIG. 4 is a fragmentary perspective view partially broken away to reveal the internal structure of the accelerometer of FIG. 2;

As is shown in FIG. 2, the vessel 1, containing an accelerometer and damping liquid, such as silicone oil sealed therein, is fixed on a base plate 3 to be placed on and attached to a moving body by conventional fastening means which may pass through the unnumbered slots along opposite side edges of the base plate. The open top vessel is composed of bottom and sidewalls completely enclosing an internal space and have a lid 2, openings 16, 17 and 18 being provided in one end wall for passage to the exterior of electrical lead wires adhered to the vibrator.

Figure 5:
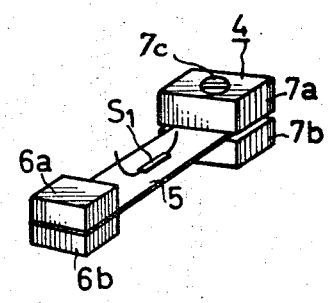
FIG. 5 is a perspective view of the vibrator alone of the accelerometer of FIG. 2.

The accelerometer within vessel 1 comprises, as is shown in FIG. 3 through FIG. 5, a vibrator 4, and a pair of damping walls 8 and 9 disposed on opposite sides, but slightly spaced from the vibrator. The vibrator 4 is a cantilever beam 5 of spring strip material, one end of which is fixed to an internal wall of the vessel by base plates 7a, 7b and bolt 7c, and the other end of which is free to vibrate. A pair of square-shaped weights 6a and 6b whose side surfaces align with the side edges of the vibrating strip 5 are fixed on the upper and lower surfaces of the free end thereof. The base plates 7a and 7b are also square, but somewhat larger than the weights so that they project laterally beyond the side edges of the vibrating strip 5 and the weights 6a, 6b. Desirably, a flat boss 10 is provided on the bottom wall of the vessel to which the vibrator is fixed by means of base plates 7a, 7b and bolt 7c, or the like.

Figure 6:
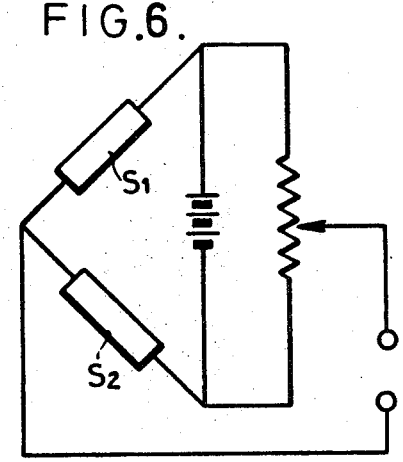
FIG. 6 is a schematic diagram of an electric circuit to be used with the accelerometer of the invention.

Gauges, such as semiconductor strain gauges $S_1$ and $S_2$, are adhered in corresponding positions on intermediate portions of the upper and lower surfaces of vibrating plate 5 between said weights and base plates, and electric lead wires connected to these gauges are led out of the vessel through the mentioned holes 16, 17 and 18 to connect to a bridge detecting circuit, as shown in FIG. 6. Said holes are sealed with an appropriate insulating material.

As is shown in FIG. 4, one end of each damping wall 8 and 9 is fixed to the side surfaces of the base plates 7a and 7b by a bolt, or the like, the pair of damping walls thus forming a space slightly wider than the vibrating strip 5, and thus define walls parallel to the axis of strip 5 extendnig perpendicular thereto and parallel to the vibrating direction thereof. The weights 6a, 6b, being the same width, or smaller, than the plate 5, are free to vibrate therewith in the space between the damping walls.

A stop pin 13 is provided at the free end of wall 8, and extending perpendicular thereto almost to the facing damping wall 9.

As shown in FIGS. 2 and 3, the lid 2 of the vessel 1 is clamped on flanged upper edges of the sidewalls of the vessel by means of screws, or the like. To seal the liquid in the vessel, an elastic thin film 11 of synthetic resin, or the like, is applied to the undersurface of the lid. This film forms a diaphragm covering an air chamber 12 formed by a cavity, or groove, in the undersurface of the lid 2 and air, or other fluid is trapped in chamber 12 by said film 11.

In operation of the above described accelerometer, the vibrator 4 is vibrated in its thickness-wise direction in response to the acceleration of a moving device to which the accelerometer is affixed, and the changes of resistance of the stress gauges $S_1$, $S_2$ adhered on the upper and lower surfaces of the vibrating plate 5 are taken as the electric output to detect the acceleration by means of the bridge detecting circuit of FIG. 6, a meter, not shown, but connected across the unnumbered terminals of the circuit, measuring said resistance changes.

Because of the small spaces between the wall surfaces of the dampening walls 8 and 9 and both side surfaces of the weights 6a and 6b at the free end of the vibrator 4, the natural frequency of the vibrator is absorbed by the viscosity resistance of oil present in said spaces. As a result, the vibrator is vibrated in accordance with the abrupt and momentary changes of acceleration working on the vibrator and, therefore, it is possible to detect the changes of acceleration correctly.

When the expansion coefficient of the damping liquid filling the vessel 1 is larger than that of the metal forming the vessel, leakage of the liquid, or damage to the vessel would normally be caused by elevation of the temperature of the liquid, but the air chamber 12 prevents these possibilities. The thin film 11 is forced into the air chamber 12 under oil pressure when the liquid expands by elevation of temperature and, therefore, the liquid remains at nearly constant pressure. For this reason the measurement errors normally caused by changes of oil pressure are eliminated and, at the same time, leakage of liquid and damage to the vessel are prevented.

As will now be explained, the operation of the accelerometer is further improved when the pair of facing damping walls 8, 9 are made of bi-metal laminations to curve in such direction that the spaces between said damping walls and the side surfaces of the weights 6a and 6b are narrowed when the temperature of the liquid is raised, thus, compensating for the change of the damping factor arising out of change of temperature.

In an accelerometer in which damping walls are disposed close to a cantilever beam-type vibrator plate on the free end of which weights are supported, the damping effect is given to the vibrator by the viscosity resistance of the liquid in the space between the damping wall and the adjacent surface of the facing weight, the damping factor being represented by the following formula:

(1)
$$\zeta = \frac{k2\mu A}{Cch}$$

where:
$k$ = constant;
$\mu$ = viscosity of the liquid;
$Cc$ = critical damping coefficient;
$A$ = area of the weight surface facing the damping wall; and
$h$ = space between the surface of the weight and that of the facing damping wall.

In the above Formula 1, $k$ is a factor which can be determined by the form and size, and $Cc$ is a spring constant of the vibrator, which depends on the mass of the weight, and when $A$ is so designed as to have a fixed value, the damping factor can be determined by the relation between the viscosity $\mu$ and the space $h$. In other words, the damping factor is actually changed in response to the change of the viscosity of the liquid. This, in turn, is mainly caused by the change of temperature of the liquid and, therefore, the change of the damping factor is attributed to the temperature change of the liquid.

The change of viscosity against the temperature change of the liquid is diagrammed in FIG. 1. When the temperature of the liquid is raised, the viscosity thereof is lowered, and the damping factor is reduced accordingly, but when the space between the damping wall and vibrator weight is changed in proportion to the elevation of the temperature of the liquid, it is possible to compensate therefor. Thus, it is possible to vibrate the vibrator to correctly respond to the acceleration by appropriate change in damping and to detect the correct acceleration within a wide temperature range by automatically compensating for the change of the damping factor caused by the temperature change through use of damping walls made of bi-metal.

The construction of damping walls 8 and 9 from bi-metal is shown in FIG. 4. Each wall 8, 9 is composed of two different metal plates, or laminations, 8a, 8b and 9a, 9b, respectively, having different coefficients of expansion. It is possible to use other materials than metal, at least for one of the plates. The facing internal plates 8b and 9b are made of the same material whose coefficient of expansion is smaller than that of the external plates 8a and 9a. As an example, amber may be used for the plates 8b and 9b, the linear expansion coefficient of amber being $0.9 \times 10^{-6}/°$ C., and brass may be used for the plates 8a and 9a, the linear expansion coefficient of brass being $19 \times 10^{-6}/°$ C. In this instance, when the temperature of the liquid is raised, the damping walls 8 and 9 curve inwardly in the direction of vibrator 4 reducing the spaces between the wall surfaces and the side surfaces of the weights 6a and 6b to increase the viscosity resistance of the liquid in these spaces. Thus, the damping factor remains constant and the change of acceleration is correctly detected.

When the damping walls 8 and 9 are curved toward each other by the elevation of temperature, the end of the stop 13 contacts the internal wall surface of the damping wall 9 to limit the space between the walls to a predetermined distance such that contact of the internal wall surfaces of the two damping walls 8, 9 against the side surfaces of the weights 6a and 6b, is avoided.

The ratio of the change of viscosity to temperature of the liquid is greater under low temperature condition and smaller under high temperature condition, see point a, FIG. 1. Therefore, the bi-metal structure of the damping walls should be varied to change the space therebetween in corerspondence with low or high temperature conditions so as to yield a more correct reading of acceleration. One way of accomplishing this is to make the length of the damping wall subject to curvature at high temperature smaller than the length subject to curvature at low temperature. This will cause a lesser change of space between the free ends of the damping walls for one degree of temperature change at high temperature than at low temperature, yielding better and more correct compensation of the damping factor.

Figure 7:
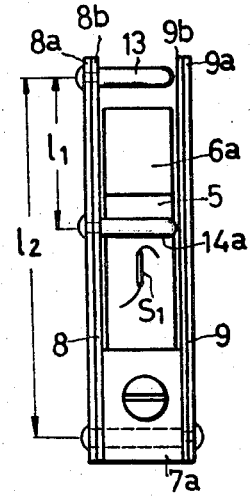
FIG. 7 is a fragmentary top plan view of the damping walls and means for adjusting the space therebetween as used in the accelerometer of FIG. 2.
Figure 8:
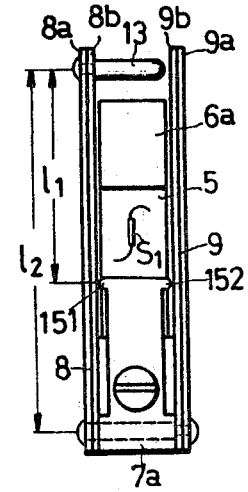
FIG. 8 is a top plan view similar to FIG. 7, but showing a modification of the damping walls and their adjustment means.

Ways of accomplishing the preceding are illustrated in FIG. 7 and FIG. 8. The vessel for containing the accelerometer and liquid, and the mode of attaching the accelerometer are the same as those of the FIG. 4 embodiment and, therefore, explanations of these are omitted. The damping walls of bi-metal in FIG. 7 are also the same, and the vibrator is vibrated in the perpendicular direction into and out of the plane of the drawing paper as illustrated in FIG. 7. A second pin stop member 14a, similar to 13, is secured to wall 8 at an intermediate position and its free end contacts the internal wall surface of the damping wall 9 when the two damping walls 8 and 9 are curved by rise of liquid temperature to a predetermined value within the temperature range in which the accelerometer can be used. A similar stop (not shown) is disposed in a symmetrical position on the other side of the vibrating strip 5. Both latter stops extend substantially perpendicular to wall 8 and nearly to wall 9. If desired, additional stops may be provided, their positions depending on the quality of bi-metal of the damping walls, the length thereof, and the kind of damping liquid, or other factors. Generally speaking, it is sufficient to provide one stop in the neighborhood of the center between the fixed end and the free end of the damping wall 8.

The space between the stop, or additional stops, and the vibrating strip 5 is chosen so that the stop will not be contacted by vibration of the vibrating plate 5.

The FIG. 7 embodiment, as described above, operates as follows. When the temperature of the liquid rises and before the free ends of the stops 13 and 14a contact the internal wall surface of damping wall 9, the damping walls curve along substantially their full lengths, $l_2$, from their fixed to their free ends. When the temperature of the liquid is raised somewhat higher the free end of the stop 14a contacts damping wall 9, preventing further reduction of the space between damping walls 8 and 9 along their lengths $l_2-l_1$. Upon further temperature rise, the stop 14a acts as a fulcrum limiting curvature of the damping walls to their end portions $l_1$. Thus, the reduction of space between the internal wall surfaces of the damping walls 8 and 9 and the weights 6a, 6b due to temperature changes at high temperature, with respect to those at low temperature, is relatively reduced in correspondence with the fact that the viscosity change with temperature change of the liquid is reduced at high temperature. In this manner, the change of the damping factor caused by the temperature change is more perfectly compensated.

In the embodiment shown in FIG. 8, the stop 14a is replaced by the projections 151, 152, protruding laterally from the inner end of base plate 7a. These stops are adapted to contact the internal wall surfaces of the damping walls 8 and 9 when the latter are curved inwardly as the temperature of the liquid is raised. Corresponding stops may be formed on the base plate 7b. The same effect is obtained as with the stop 14a, FIG. 7.

In accordance with the above described embodiments of the accelerometer in which liquid is used as the damper, a pair of facing damping walls are provided on both sides close to the vibrator to form slight spaces between the side surfaces of the vibrator and the damping walls. The damping walls are made of bi-metal laminations which curve inwardly and outwardly with rise and fall of temperature of the damping liquid, i.e., in directions to respectively reduce and increase the spaces between the vibrator and damping walls. With this construction, the vibrator will vibrate correctly in correspondence with the change of acceleration, and the viscosity resistance of the liquid in said spaces is adjusted within a wide temperature range to prevent errors arising out of temperature changes and their effects on the damping factor.

The adjustment for the temperature is bettered by the described stop means in that it is possible to more perfectly compensate the change of the amping factor, the stop means enabling a smaller reduction of the damping space under high temperature, and relatively larger reduction of the damping space under low temperature.

The weights are not always necessary, and the form of the vibrator and its mode of attachment to the vessel can be optionally changed.

A plurality of the above described accelerometers may be provided on the same base in such a manner that their vibrating directions are perpendicular to one another. Such an integrated accelerometer can detect the values of acceleration components in the vibrating directions of the respective vibrators at the portion of the body to which said accelerometer is attached. The value and the direction of acceleration given to said body portion is obtained by combining said values of acceleration components.

Figure 9:
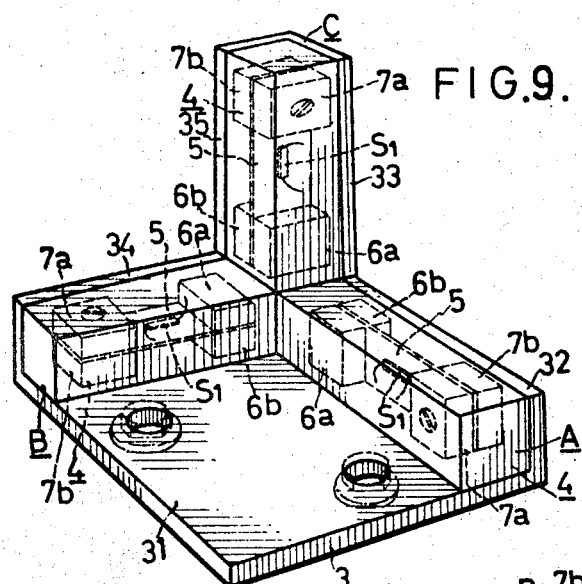
FIG. 9 through FIG. 11 are fragmentary perspective views showing modified embodiments of the accelerometer in which a plurality of accelerometers are combined on a single mounting plate.

An embodiment in which three accelerometers are attached to the base is shown in FIG. 9. The longitudinal axes of the three vibrators are respectively perpendicular to each other, and the extended lines thereof substantially intersect, or cross, at one point. The vibrating directions of the three vibrators are also respectively perpendicular to each other.

Figure 10:
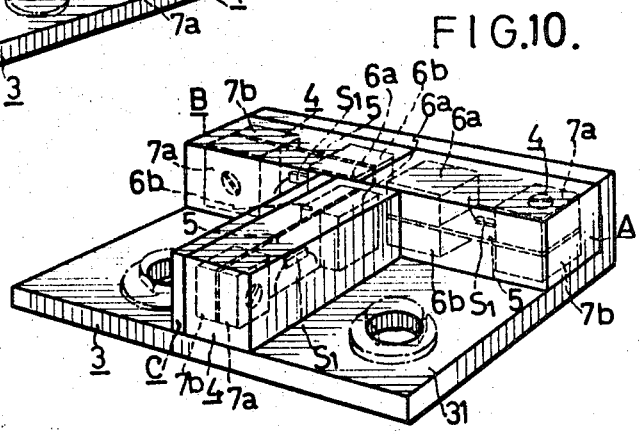
Figure 11:
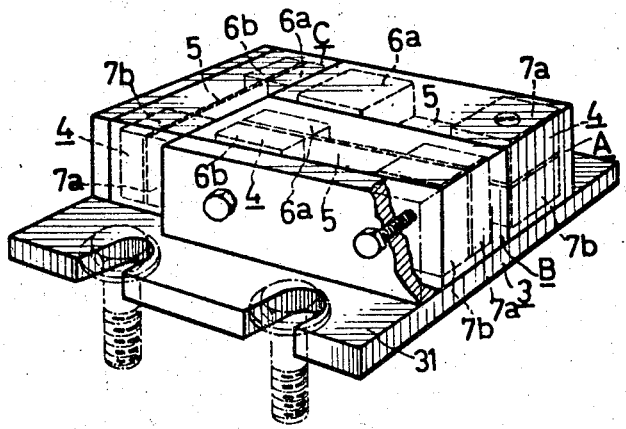

In the embodiment of FIG. 9, and the similar composite embodiments of FIGS. 10 and 11, each of the three accelerometers used is the same as that shown in FIGS. 1–8. Therefore, certain detailed portions of the respective accelerometers are omitted. In FIG. 9, vertical upstanding sidewalls 32, 33, 34 and 35 are on two neighboring sides of the upper surface 31 of base plate 3. The three accelerometer units A, B and C, each housed on its own oil-enclosing vessel, such as vessel 1 of FIG. 1, are oriented to vibrate their respective weights 6a and 6b at right angle to one another. The bottom wall of the vessel of the unit A is fixed on the sidewall 32 of the base by means of a bolt, or the like, not shown. A sidewall of the vessel of unit B is placed against the sidewall 34 of the base and the bottom wall of the unit B is fixed on base plate surface 31. One sidewall of the vessel of the unit C is secured against the sidewall 33 of the base, and the bottom wall of the unit C is fixed on the sidewall 35 of the base.

When the base plate 3 of the accelerometer is fixed on a moving device, it is possible to simultaneously and correctly detect acceleration components in the vibrating directions of the vibrators of the respective units regardless of a wide range of change of the liquid sealed in each of the three units, and by combining said acceleration components it is possible to detect the direction and the value of acceleration given to the portion of the device where said accelerometer is attached.

In addition to the above, the error caused by the effect of rotating acceleration is reduced by having the longitudinally directed axial lines of the respective vibrators of the units crossed in the neighborhood of one point.

In FIGS. 10 and 11, other embodiments are shown wherein the accelerometer units A, B and C are secured in one plane against the same surface. In FIG. 10 the vessels of the respective units are fixed on the surface 31 of the base plate in such a manner that the longitudinally directed axial lines of the respective vibrations 4 of the units A and B are substantially in one straight line, and the vibrating directions thereof are in perpendicular relation to each other. The longitudinally directed axial line of the vibrator 4 of the unit C is substantially in rectangular relation to said straight line, and the vibrating direction thereof is perpendicular to each of the vibrating directions of the vibrators of the units A and B. Units A and B are secured against a vertical flange at one side of the base plate 3.

FIG. 11 shows another embodiment in which the vessels of the respective units are fixed on the surface 31 of the base plate in such a manner that the longitudinally directed axial lines of the respective vibrators 4 of the units A and B are in parallel relation, and the vibrating directions thereof are in perpendicular relation to each other, while the longitudinally directed axial line of the vibrator 4 of the unit C is in rectangular relation to those of the units A and B, and the vibrating direction thereof is perpendicular to each of the vibrating directions of the vibrators of the units A and B. Units A and B respectively are secured to a pair of upstanding vertical flanges at right angle to one another.

Thus, with the FIGS. 9–11 structures, it is possible to detect the values of acceleration components, working on a moving body to which the composite accelerator is attached, in the vibrating directions of the respective vibrators, and to combine these values to detect the value and direction of the overall acceleration.

The above described embodiments are structured with convenience of assemblage in mind. A number of changes are possible. For example, in the embodiment shown in FIG. 9, the base 3 may be formed as a cube with cut-out portions in which the accelerometer units may be seated and secured. The cut-outs may be made along lines intersecting at a common point, and an accelerometer unit may then be fixed into each of said cut-outs so as to occupy the same positional relation as in FIG. 9.

In the embodiment of FIG. 10, the longitudinally directed axial lines of the vibrators of units A and B are not required to be in one straight line, nor are the axes of the three units required to be in parallel or rectangular relation to each other. The direction of unit C on the base plate can be changed.

In the embodiments shown in FIG. 9 through FIG. 11, three accelerometer units are integrated, but one of said units may be omitted, thereby forming an accelerometer for detecting bi-directional acceleration.

Additional accelerometer units may be added to the three units of FIGS. 9, 10 or 11. The vibrating directions of the added vibrators need not be perpendicular to the vibrating directions of the respective vibrators of said three units. It is thus possible to detect polydirectional accelerations and rotating acceleration, and to increase the output of the accelerometer device.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An accelerometer comprising a vessel filled with a viscous liquid sealed therein, a vibrator of elastic material including a weight fixed near one end thereof, said vibrator being within said vessel and having its other end free to vibrate, at least one strain sensing element attached to said vibrator, electrical conductor means leading from said strain sensing element to the exterior of the vessel, a pair of damping walls disposed on both sides of said vibrator, each of said damping walls being formed of a pair of laminated strips adapted to curvilinearly bend under temperature change, said damping walls being oriented in planes parallel to the plane of vibration of the vibrator and said vibrator having surfaces substantially parallel to the damping walls to shear the liquid in the space between the walls and provide damping, the inner strip of each wall facing the vibrator having a smaller coefficient of expansion than the outer strip, and at least one stop element located between said damping walls at a point between the fixed and free ends of said walls to allow curving of the two damping walls throughout their lengths before the temperature of the liquid within the vessel rises to a predetermined value, said stop element contacting the facing surfaces of the two damping walls when the temperature of said liquid reaches said predetermined value to fix the space between the two damping walls and prevent further bending of the walls except at the free portions beyond said stop element, said stop element acting as a fulcrum about which said free portions of the damping walls curve when the temperature of the liquid rises above said predetermined value.

2. An accelerometer according to claim 1, wherein said inner strips of the damping walls extend in planes parallel to the direction of vibration of said vibrator, said weight having side faces substantially parallel to said inner strips to form narrow spaces between said side faces and the corresponding inner surfaces of said inner strips.

3. An accelerometer according to claim 1, wherein another stop element is provided between the free ends of said damping walls for engagement therewith to prevent said walls from contacting said vibrator.

4. An accelerometer according to claim 1, wherein a fluid chamber having a flexible wall is provided within said vessel and subject to contraction and expansion with temperature change of said viscous liquid pressing against said flexible wall.

5. A unitized device for simultaneously measuring acceleration in a number of directions having, in combination, a common base plate and a plurality of accelerometers as defined in claim 1 mounted on said base plate and so arranged that the vibrating directions of the vibrators thereof are perpendicular to each other.

6. A unitized device for simultaneously measuring acceleration in three directions according to claim 5 wherein three accelerometers are provided on said base plate and so arranged that the longitudinally directed axes of the accelerometers are perpendicular to one another and the vibrating directions of the vibrators of the accelerometers are also perpendicular to each other.

7. A unitized device for simultaneously measuring acceleration in three directions according to claim 5 wherein three accelerometers are provided on said common base plate and so arranged that the longitudinally directed axial lines of the respective vibrators of two accelerometers are substantially in one straight line, the longitudinally directed axial line of the vibrator of the other accelerometer is substantially in rectangular relation to said straight line, and the vibrating directions of the vibrators of said three accelerometers are perpendicular to each other.

8. A unitized device for simultaneously measuring acceleration in three directions according to claim 5 wherein three accelerometers are provided on said base plate and so arranged that the longitudinally directed axes of the respective vibrators of two accelerometers are parallel to each other and perpendicular to the longitudinally directed axis of the vibrator of the other accelerometer respectively, and the vibrating directions of the vibrators of said three accelerometers are perpendicular to each other.

9. A device according to claim 5, wherein a compressible fluid chamber is provided within each vessel of said accelerometers, said fluid chambers being subject to contraction and expansion with temperature change of the viscous liquid in each vessel pressing against the fluid chamber.

References Cited

UNITED STATES PATENTS

| | | | |
|---|---|---|---|
| 2,359,245 | 9/1944 | Ritzmann | 73—71.2 |
| 2,822,161 | 2/1958 | Tikanen | 73—497 |
| 3,267,740 | 8/1966 | Stedman | 73—516 |
| 3,304,787 | 2/1967 | Chiku et al. | 73—517 |

RICHARD C. QUEISSER, Primary Examiner

H. GOLDSTEIN, Assistant Examiner

U.S. Cl. X.R.

73—430; 188—100